(No Model.) 4 Sheets—Sheet 1.
J. G. HODGSON.
SIDE SEAM SOLDERING MACHINE.
No. 522,256. Patented July 3, 1894.
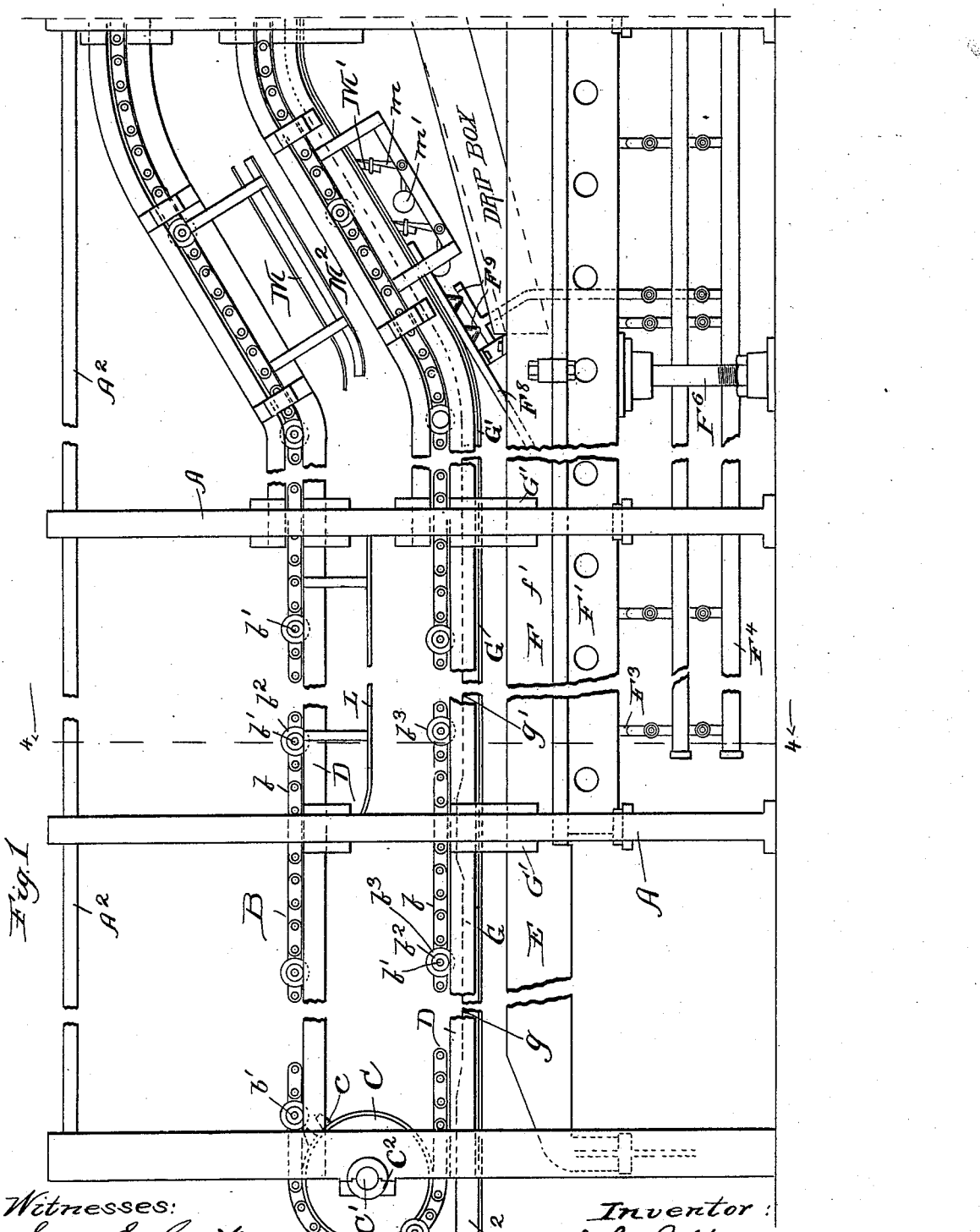

(No Model.)
4 Sheets—Sheet 2.
J. G. HODGSON.
SIDE SEAM SOLDERING MACHINE.
No. 522,256.
Patented July 3, 1894.
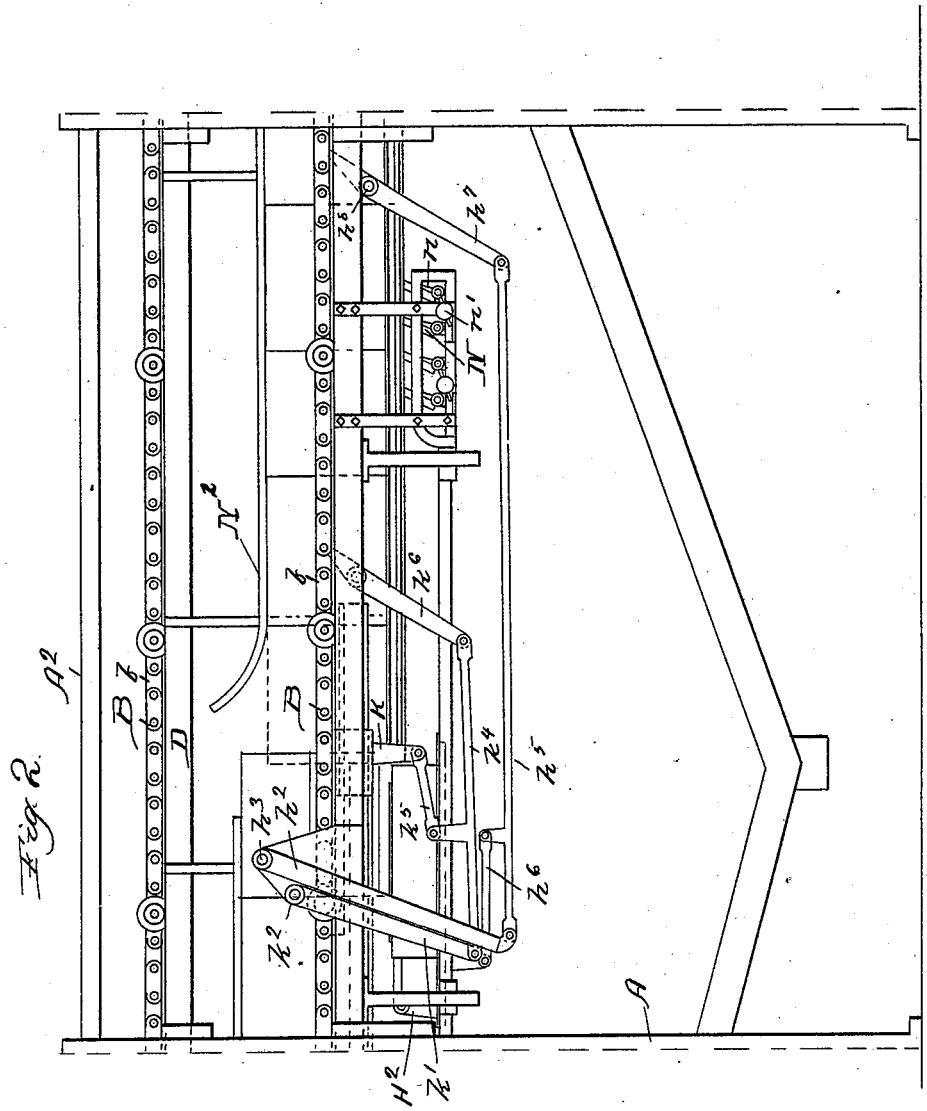
Witnesses:
Inventor:
John G. Hodgson.
By Munday, Evarts & Adcock.
his Attorneys.

(No Model.) 4 Sheets—Sheet 3.
J. G. HODGSON.
SIDE SEAM SOLDERING MACHINE.
No. 522,256. Patented July 3, 1894.
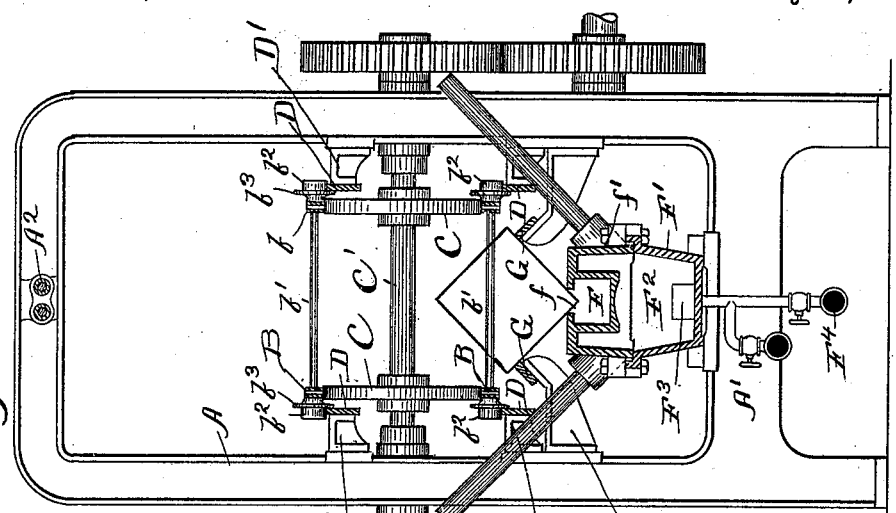
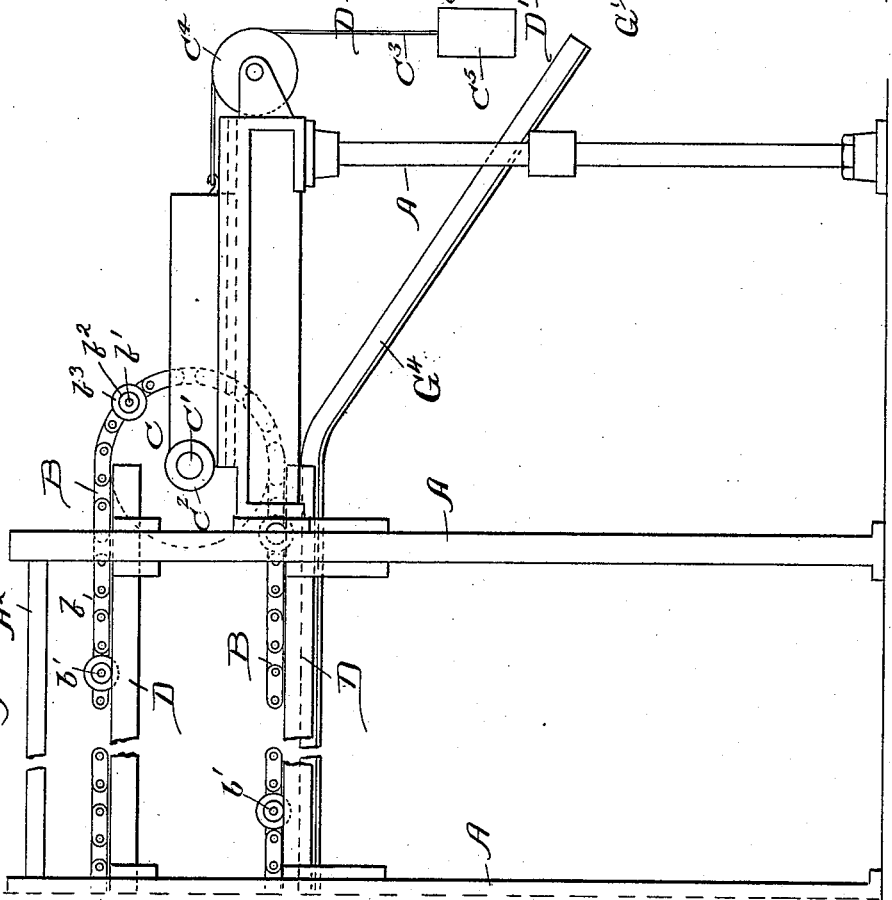
Witnesses:
Lew. E. Curtis
H. W. Munday
Inventor:
John G. Hodgson.
By Munday, Evarts & Adcock
his Attorneys.
THE NORRIS PETERS CO., PHOTO-LITHO., WASHINGTON, D. C.

(No Model.) 4 Sheets—Sheet 4.
J. G. HODGSON.
SIDE SEAM SOLDERING MACHINE.
No. 522,256. Patented July 3, 1894.
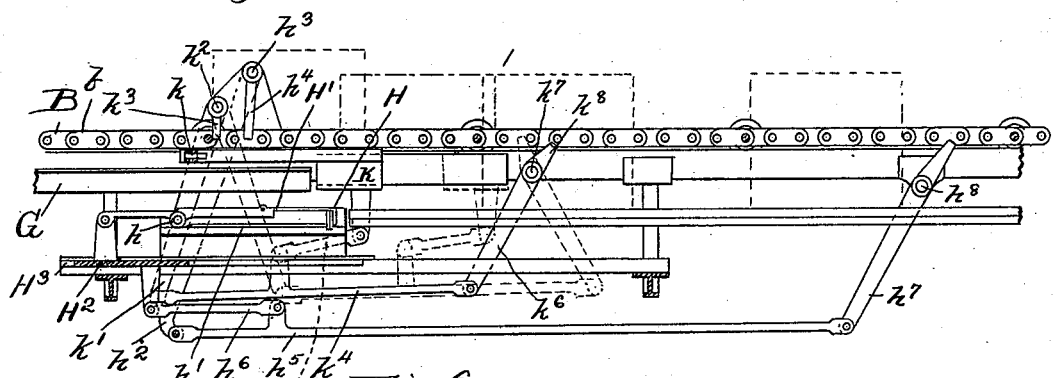
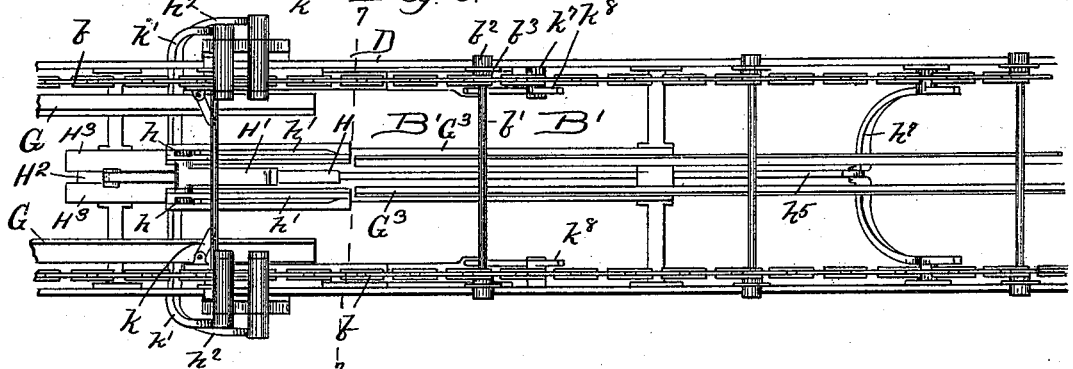
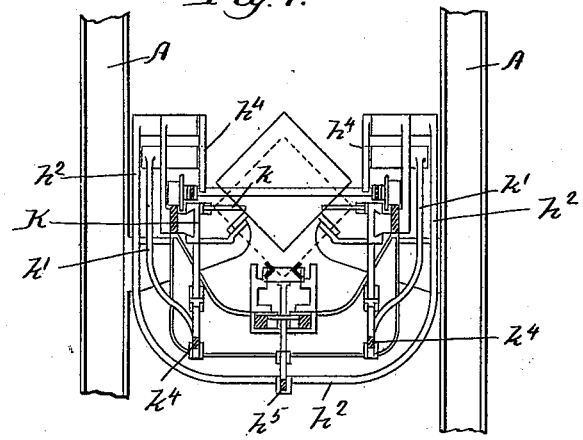
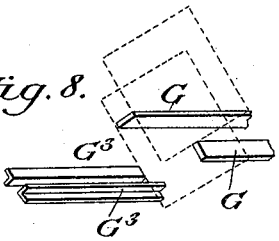
Witnesses:
Lew. E. Curtis
H. W. Munday
Inventor:
John G. Hodgson
By Munday, Evarts & Adcock
His Attorneys.
THE NORRIS PETERS CO., PHOTO-LITHO., WASHINGTON, D. C.

UNITED STATES PATENT OFFICE.

JOHN G. HODGSON, OF MAYWOOD, ILLINOIS, ASSIGNOR TO EDWIN NORTON, OF SAME PLACE, AND OLIVER W. NORTON, OF CHICAGO, ILLINOIS.

SIDE-SEAM-SOLDERING MACHINE.

SPECIFICATION forming part of Letters Patent No. 522,256, dated July 3, 1894.

Application filed July 23, 1892. Renewed March 14, 1894. Serial No. 503,557. (No model.)

*To all whom it may concern:*

Be it known that I, JOHN G. HODGSON, a citizen of the United States, residing in Maywood, in the county of Cook and State of Illinois, have invented a new and useful Improvement in Side-Seam-Soldering Machines, of which the following is a specification.

My invention relates to improvements in machines for soldering the side seams of sheet metal cans or other vessels.

It relates more particularly to certain improvements upon the side seam soldering machine patented in Letters Patent Nos. 250,096 and 382,344. In the side seam soldering machine constructed under said patents the cans are conveyed by a carrier along a suitable track or way which extends over the fluxing and soldering baths or devices and the soldered seam is wiped on the inside of the can to remove the surplus solder by a reciprocating wiper, the same having a much quicker or swifter movement than the can carrier so that the can may be wiped throughout its entire length without stopping or retarding the proper movement of the carrier. This machine has been used very extensively and with great success upon ordinary cans, such as are commonly used for putting up fish, meat, fruits, vegetables and other food products. But it will be obvious that to use this machine upon long cans, such for example as those double the length of ordinary cans, it would be necessary on the one hand either to materially diminish the speed of the can carrier, and thus the capacity of the machine, or else to greatly accellerate the motion of the reciprocating inside wiper, which latter is very undesirable for reasons obvious to those skilled in the art.

The object of the present invention is to provide a simple, efficient and economical means for wiping the soldered seam on the inside of the can, and whereby long cans may be thus wiped without the necessity of imparting an injuriously rapid movement to the reciprocating inside wiper on the one hand, or an undesirable slow movement to the can carrier on the other hand.

The invention consists in the means I employ to accomplish this result.

It also consists in certain novel devices and novel combinations of parts and devices herein shown and described and more particularly pointed out in the claims.

A machine embodying my invention comprises, in connection with the soldering and fluxing devices or baths, a can carrier, a reciprocating wiper, and means for moving the can body forward in respect to the carrier, so that the wiping may be performed, or partially performed, while the carrier is overtaking the can thus moved forward. The machine is also furnished with a jog or depression in the track upon which the cans are pushed along by the carrier, such jog or depression giving room for the wiper to enter the can.

Another feature of improvement embodied in my present machine consists, in connection with the chain can carrier and the track for the cans and the sprocket wheels or pulleys for such carrier, in combining the track and carrier together in such way that the pulleys or wheels around which the chain passes, are located above the track, and in providing the track with an extension or feed table extending under or beyond the pulley, so that the chain carrier and its pulley will, in combination with such feed table extension, operate to feed or convey automatically the can bodies into the machine.

In the accompanying drawings forming a part of this specification, Figures 1, 2 and 3 are together a side elevation of a machine embodying my invention. This side elevation however does not show the whole length of the machine, the breaks in the several figures indicating the omission of many intermediate links in the chain carrier and intermediate portions of the tracks and of the flux and solder baths. Fig. 4 is a vertical cross section of the machine taken on the line 4—4 of Fig. 1. Fig. 5 is a partial vertical longitudinal sectional view. Fig. 6 is a partial plan view of mechanism shown in Fig. 5. Fig. 7 is a detail cross section on line 7—7 of Fig. 6. Fig. 8 is an enlarged detail view of a portion of the track upon which the can bodies ride.

In the drawings A represents the frame of the machine, the same being of any suitable construction, but consisting preferably of a series of double or U-shaped standards or posts connected together by suitable cross bars or webs A' and connected together in the direction of the length of the machine by the rods or tubes A², and also by the tracks for the carrier and for the cans, and by the flux and solder vessels, or their supports.

B is the can carrier consisting, preferably, of two flexible link chains $b$ connected together by cross bars $b'$ $b'$ at intervals. The flexible carrier B extends around and is driven by the pulleys or wheels C, the shafts C' of which are journaled in suitable bearings C² on the frame of the machine. The cross bars $b'$ of the chain carrier are furnished at either end with anti-friction wheels or rollers $b^2$ which travel upon the tracks D. The wheels or rollers $b^2$ are furnished with flanges $b^3$ to guide the carrier on the track D. There is one line of tracks D for the upper loop of the chain and another similar line for the lower loop. The tracks D are secured to and supported by suitable brackets D' attached to the upright standards of the frame at the inside thereof, as is clearly indicated in Fig. 4.

E represents the fluxing bath or device and F the solder bath or device, the same being located below the lowermost loop of the chain carrier.

G is the device for supporting the cans as they are moved along by the can carrier or conveyer. This can supporting device is, preferably, not located on the carrier as it makes a better as well as a more economical construction to fix it stationary to the frame; the same being, preferably, a continuous track along which the can bodies may slide. As illustrated in the drawings, it consists of two rails, one on each side of the can body; and the track rails G are secured to and supported by suitable brackets G' attached to the vertical standards of the frame. The spaces B' in the carrier between the cross bars $b'$, constitute the pockets or receptacles in the carrier for the cans. The can pockets or receptacles B' are made considerably longer than the can bodies to be operated upon and preferably about twice the length of the can body, which is ordinarily or chiefly designed to be soldered in the machine. By providing the can carrier thus with pockets or receptacles B' materially longer than the can bodies, a simple provision is thus made for permitting the can bodies to be moved forward or along in respect to the carrier while the carrier is in motion.

The track G upon which the can bodies ride, is furnished with an extension or feed table G² extending under the wheel or pulley around which the chain passes; so that when a can body is placed either by hand or automatically, upon this feed table or extension G² the cross bar $b'$, which forms the end of the can pocket B' in the carrier, will, as it passes around the pulley, engage the rearmost end of the can body, and thus automatically itself feed or push the can body from the feed table into the machine. The continuous track G, upon which the can bodies rest, is furnished with a widened or depressed portion $g$ to permit the can body to come in contact with the flux, and a similar widened or depressed portion $g'$ to permit the can body to come in contact with the molten solder in the solder vessel F. The solder vessel F has a longitudinal slot or opening $f$ to receive the seam of the can. And it is further provided with an outer metallic shell $f'$ which forms with the half shell F' a flame chamber F² surrounding the solder vessel F at its bottom and sides. The heat chamber F² is preferably heated by gas supplied through the burners F³ and pipes F⁴.

The can supporting track G is provided with a jog or depression G³, which permits the can body to drop down below its ordinary level to enable the reciprocating wiper H to enter inside the can body. The wiper H consists, preferably, of a brush or pad of asbestus or other suitable material attached to a holder H' pivoted to a slide or cross head H², which reciprocates in suitable guides H³ on the frame of the machine. The pivoted holder H' of the wiper has a roller or guide arm $h$ which works in a suitable guide $h'$ on the frame to produce the requisite pressure of the wiper upon the can or seam. The wiper slide or cross head H² is operated by a lever $h^2$ pivoted at $h^3$ to the frame of the machine, or to a bracket secured thereto, and having a short arm $h^4$ which projects in the path of the cross bar $b'$ of the can carrier B, and is engaged and operated thereby. The long arm of this operating lever $h^2$ is connected to the wiper slide through the pivoted links $h^5$ $h^6$. The wiper slide is returned to position by a second lever $h^7$, which is pivoted at $h^8$ to the frame, the short arm of which is likewise engaged by one of the cross bars $b'$ on the carrier B. The long arm of the lever $h^7$ is pivoted to the connecting link $h^5$.

To move the can body to the forward end of its pocket B' of the carrier prior to the commencement of the wiping operation, so that the wiping operation may take place in part while, or be continued until, the rear end of the pocket B' again overtakes the can body, I provide means for pushing or moving the can body to the forward end of its pocket at this time.

The means or mechanism employed for moving the can body to the forward end of its pocket in the carrier may be of any suitable form or construction; and its form and construction may be greatly varied by skilled mechanics, as well as the means for operating the reciprocating wiper. The particular means which I have however heretofore generally employed for moving the can body forward in its pocket consists simply of a movable slide K furnished with a pivoted finger or pawl $k$ to engage the rear end of the can body and push it forward in the pocket of the carrier as the carrier moves along. The pivoted or yielding finger permits the can body to pass the finger. This can body moving slide or device is preferably duplicated on each side of the machine so as to engage both sides of the can at the end thereof. It is preferably given the necessary quick movement by a lever $k'$ pivoted to the frame at $k^2$ and the short arm $k^3$ of which is engaged by the cross bar $b'$ of the carrier B. The long arm of this lever is connected to the slide K by pivoted links $k^4$ $k^5$. A second lever $k^6$ pivoted at $k^7$ to the frame, and operated by the carrier B engaging its short arm $k^8$ serves to return the slide K to place. Upper guides L serve to keep the can bodies properly in contact with the molten solder as they pass over the solder bath F. An upper guide M serves to hold the can bodies properly in contact with the outside wiper M', at the incline $M^2$ in the tracks for the carrier and for the cans. The exterior wipers M' are secured to or carried by pivoted arms or levers $m$ furnished with weights $m'$ to press the wipers against the seam. Beyond the inside reciprocating wiper H, I provide a second set of external wipers N, the same being carried by pivoted arms $n$ having weights $n'$, the can bodies being held in contact with these wipers by a guide or holding device $N^2$ above the cans and preferably secured to the stationary frame of the machine. By this improvement it will be observed that the can body during the wiping operation, or a portion thereof is, so to speak, moving backward in respect to the carrier or from the front end to the rear end of its pocket in the carrier; or in other words the can remains, or may remain stationary in respect to the frame of the machine during the interval that the carrier moves forward about the length of the can body.

The jog, shoulder, or depression $G^3$ in the can track G is so located or constructed in relation to the reciprocating wiper and to the reciprocating device for moving the can bodies on or along the carrier that the can body will drop into or enter this depression as soon as it is moved to the front end of its pocket B' in the carrier, and thus be in position for the reciprocating wiper to enter the can body. The track G upon which the can bodies rest or slide is also provided with an inclined delivery chute or extension $G^4$ into or onto which the can bodies are automatically discharged or delivered by action of the flexible carrier B as it turns or travels around the pulley at the rear or delivery end of the machine.

The machine shown in the drawings is one specially designed for the manufacture of large square petroleum cans, but my invention may of course be used on machines for making various other kinds of cans whether round or square.

The machine hereinbefore described for automatically feeding the can bodies into the machine involves the use of pulleys for the chain carrier B, consisting of two separate rings or wheels with an open space between them for the admission of the can bodies; that is to say the pulley shaft C' has fixed to it two rims or wheels C C, one for each of the chains $b$. The wheels C are, preferably, not polygonal but circular, and the links of each of the chains $b$ are short and the number of them employed, for example ten, between each pair of cross bars $b'$, as is clearly indicated in the drawings. By thus employing round pulley wheels C, in connection with short link chains $b$ furnished with cross bars $b'$ at intervals to constitute the pockets or receptacles for the can bodies, and by furnishing the cross bars with anti-friction rollers or wheels to travel on the tracks, the injurious effects due to the more or less jerky motion imparted to the cans, by employing a carrier chain having long links and polygonal wheels is entirely overcome or prevented during the soldering operation. By this construction of the can carrier the can bodies are conveyed through the solder bath in an easy, uniform and steady manner conducing to the production of the best results, at the same time less power is required to run the machine and its durability increased.

The solder bath or vessel F is furnished with an inclined center bar or track $F^8$ for the angle or nose of the can to ride against at the inclined portion G' of the track G where the can rises out of the solder bath. This inclined center bar or track $F^8$ extends down into the solder and is heated thereby and also by burners or gas jets $F^9$ placed beneath the same to prevent the congealing of the surplus solder before it has time to flow out of the can. The inclined center bar or track $F^8$ is a simple bar of metal fixedly attached to the frame in position to engage the seam or corner of the can and assist in tilting it and raising it out of the solder bath as the can is moved along by the carrier. This heated bar of metal also assists somewhat in preventing the surplus solder from congealing before the can reaches the wiping devices. The solder bath and the flux bath also are mounted on adjusting screws $F^6$ to enable the level of these vessels to be properly and conveniently adjusted.

The pulleys C are preferably formed with projections or notches $c$ to engage the cross bar $b'$ to insure the proper and regular movement of the chain carrier. One of the pulleys or sprockets C is mounted on a cross slide $C^8$ which is held in position against the tension of the chain carrier by a weight $c^5$ suspended by a line $C^3$ attached to the cross head C' which passes over the pulley $C^4$.

The solder vessel is provided with inclined tubes, shown clearly in Fig. 4, for feeding bar or wire solder into the solder vessel. These inclined solder feed tubes feed the solder into the solder chamber F at the widened or reservoir portion of the same near one end of said trough or vessel F.

I claim—

1. In a side seam soldering machine having a soldering device or bath, the combination of a can carrier with a reciprocating wiper for wiping the can body on the inside, and means for moving the can body in respect to the carrier, substantially as specified.

2. In a side seam soldering machine, the combination with a reciprocating or movable wiper, of a can carrier and means for moving the can body in respect to the carrier, substantially as specified.

3. The combination with a continuously moving can carrier of a reciprocating wiper, and a reciprocating slide or device for moving the can bodies forward in respect to the carrier, substantially as specified.

4. The combination with a continuously moving can carrier of a reciprocating wiper, and a reciprocating slide or device for moving the can bodies forward in the carrier, both said reciprocating devices, the wiper and slide, having a greater speed than the carrier, substantially as specified.

5. The combination with a link chain can carrier B having pockets B' for the cans longer than the cans to be operated upon, tracks and pulleys for said carrier, a track for the cans, a reciprocating wiper and a reciprocating slide or device for moving the can bodies from the rear to the front end of said pockets, substantially as specified.

6. The combination with a link chain can carrier B having pockets B' for the cans, longer than the cans to be operated upon, tracks and pulleys for said carrier, a track for the cans, a reciprocating wiper and a reciprocating slide or device for moving the can bodies from the rear to the front end of said pockets, said reciprocating slide having yielding finger or pawl $k$ to engage the cans and push them forward and to permit the cans to pass said finger, substantially as specified.

7. The combination with a link chain carrier B having pockets B' for the cans longer than the cans to be operated upon, tracks and pulleys for said carrier, a track for the cans, a reciprocating wiper and a reciprocating slide or device for moving the can bodies from the rear to the front end of said pockets, and a lever projecting in the path of said carrier for operating said slide, substantially as specified.

8. The combination with a link chain carrier B having pockets B' for the cans longer than the cans to be operated upon, tracks and pulleys for said carrier, a track for the cans, a reciprocating wiper and a reciprocating slide or device for moving the can bodies from the rear to the front end of said pockets, and a pair of levers projecting in the path of said carrier for operating said can body moving slide, substantially as specified.

9. The combination of a can carrier having pockets or receptacles to receive the can bodies longitudinally of the direction of movement of the carrier, a track or device for supporting the cans as they are moved along by the carrier, and an inside reciprocating wiper adapted to enter the can body, said can body supporting track having a jog therein to permit said wiper to enter the can, and means for moving the can body forward along or in respect to said carrier and pushing the same into the jog portion of said track, substantially as specified.

10. In a soldering machine the combination with a solder bath, of a can carrier chain B having pockets B' for the can bodies, a track for said carrier, a jogged guide way or track for the can bodies and an inside reciprocating wiper entering the can body at the jog in said track or guide way, and a reciprocating device for pushing the can bodies from the rear to the forward end of said pockets, substantially as specified.

11. In a side seam soldering machine, the combination with a can body carrier and a soldering device, of an external wiper, an inside wiper, and a second external wiper to which the can bodies are presented by the carrier after being acted upon by said first two mentioned wipers, substantially as specified.

12. In a side seam soldering machine the combination with a can body carrier, a molten solder bath and an inclined center bar or track $F^8$ to engage the angle or seam of the can and extending into the bath for the angle or seam to ride against as it is raised out of the bath by the movement of the carrier, substantially as specified.

13. In a side seam soldering machine the combination with a can body carrier, a molten solder bath and an inclined center bar or track $F^8$ to engage the angle or seam of the can and extending into the bath for the angle or seam to ride against as it is raised out of the bath by the movement of the carrier, and burners for heating said inclined center bar, substantially as specified.

JOHN G. HODGSON.

Witnesses:
H. M. MUNDAY,
EMMA HACK.